United States Patent
Dalton et al.

(10) Patent No.: US 6,419,154 B1
(45) Date of Patent: Jul. 16, 2002

(54) METHODS AND APPARATUS FOR AN ELECTRONIC SHELF LABEL COMMUNICATION SYSTEM HAVING MULTIPLE TRANSMIT ANTENNAE

(75) Inventors: Gary C. Dalton, Snellville; Peter H. Plocher, Duluth, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/826,047

(22) Filed: Apr. 4, 2001

(51) Int. Cl.$^7$ .......................... G06K 15/06; G06K 15/20
(52) U.S. Cl. ......................... 235/383; 235/492
(58) Field of Search .......................... 235/492, 375, 235/380, 382, 493, 487, 462.01, 383; 705/17, 41, 42

(56) References Cited

U.S. PATENT DOCUMENTS

| | | | | |
|---|---|---|---|---|
| 5,192,947 A | * | 3/1993 | Neustein | 340/825.44 |
| 5,335,363 A | * | 8/1994 | Basciano | 455/73 |
| 6,133,891 A | * | 10/2000 | Josypenko | 343/895 |
| 6,192,829 B1 | * | 2/2001 | Karazim et al. | 118/723 |
| 6,232,870 B1 | * | 5/2001 | Garber et al. | 340/10.1 |
| 6,285,342 B1 | * | 9/2001 | Brady et al. | 343/895 |
| 6,367,697 B1 | * | 4/2002 | Turner et al. | 235/440 |
| 2002/0033416 A1 | * | 3/2002 | Gerszberg et al. | 235/380 |

FOREIGN PATENT DOCUMENTS

| | | | |
|---|---|---|---|
| EP | 000156725 A1 | * | 10/1985 |
| JP | 405314330 A | * | 11/1993 |

* cited by examiner

Primary Examiner—Thien M. Le
(74) Attorney, Agent, or Firm—Priest & Goldstein PLLC

(57) ABSTRACT

Techniques for a wireless electronic shelf label (ESL) system including a relay unit having multiple transmit antennae connected to a single RF transmitter. The transmitter is connected to the multiple transmit antennae through an impedance matched power splitter which uniformly splits the transmitter power output and allows each transmit antennae to transmit a fraction of the total transmit power produced by the transmitter. By locating the transmit antennae in multiple locations in a retail establishment, an improved pattern of RF coverage can be provided for ESLs, when compared to the traditional single transmit antenna. Additionally, the cost of the ESL system is low since fewer RF transmitters are required.

20 Claims, 3 Drawing Sheets

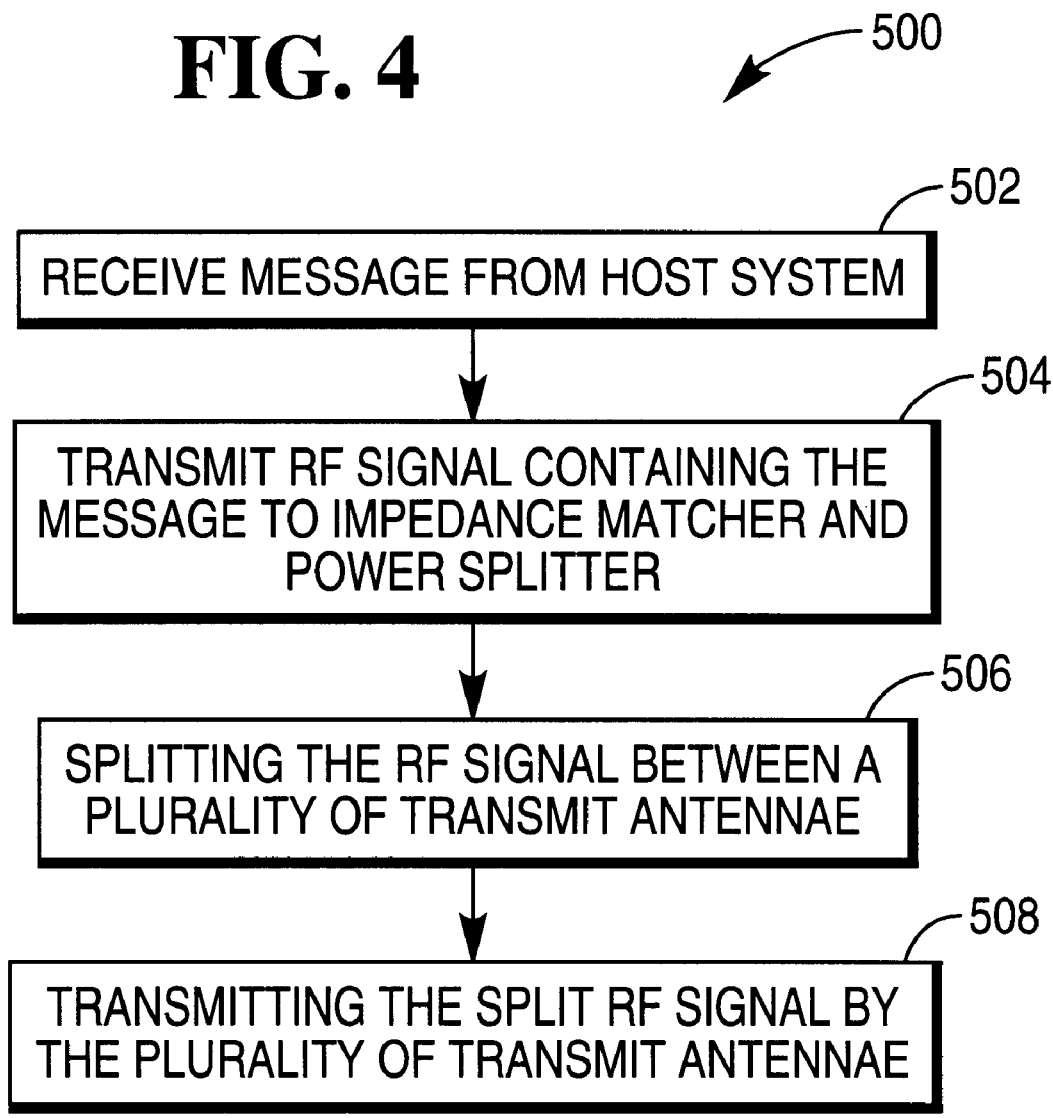

METHODS AND APPARATUS FOR AN ELECTRONIC SHELF LABEL COMMUNICATION SYSTEM HAVING MULTIPLE TRANSMIT ANTENNAE

FIELD OF THE INVENTION

The present invention relates generally to improvements in electronic shelf label (ESL) systems used in transaction establishments. More specifically, the present invention relates to advantageous aspects of a wireless ESL communication system having multiple transmit antennae.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. Price information displayed by the ESLs is obtained from a price look-up (PLU) data file. The central server sends messages, including price change messages, to the ESLs through a relay unit which may be mounted in the ceiling of the retail establishment.

The communications link from the relay unit to an ESL, known as the "downlink", typically uses radio frequency (RF) technology. To ensure that a message transmitted to the ESL was properly received, the ESL transmits a positive acknowledgement over an "uplink" communication path to the relay, which then relays the acknowledgment to the central server. The downlink communications path is separate from and may employ different technology than the uplink communication path, since the uplink path transmits much less data than the downlink path.

ESLs may be installed in a variety of premises presenting many RF barriers which may hinder the transmission of messages along the downlink. Previously, these barriers to RF transmission were overcome by including additional relay units, each having a single transmit antenna, at multiple locations throughout the retail establishment in order to ensure reliable transmission and coverage. While it is important for the communication links to be reliable, for ESL systems to be cost effective the ESLs must be inexpensive and the cost of the infrastructure, such as the relay units, kept to a minimum. Adding additional relay units to the retail establishments to overcome the RF barriers can significantly increase the cost of an ESL system, as each of the relay units includes a relatively expensive transceiver or transmitter.

Thus, it would be desirable to provide an ESL system having a relay unit which includes a single transmitter connected to multiple transmit antennae to provide improved RF transmission while maintaining lower costs.

SUMMARY OF THE INVENTION

The present invention advantageously provides methods and apparatus for a wireless ESL communication system including a relay unit having multiple transmit antennae connected to a single RF transmitter. The transmitter is connected to the multiple transmit antennae through an impedance matched power splitter which uniformly splits the transmitter power output and allows each transmit antennae to transmit a fraction of the total transmit power produced by the transmitter. By locating the transmit antennae in multiple locations in a retail establishment, an improved pattern of RF coverage can be provided for ESLs, when compared to the traditional single transmit antenna. Additionally, the cost of the ESL system is low since fewer RF transmitters are required.

A more complete understanding of the present invention, as well as further features and advantages of the invention, will be apparent from the following detailed description and the accompanying drawings.

BRIEF DESCRIPTION OF THE DRAWINGS

FIG. 4 shows a method of communicating with an ESL in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
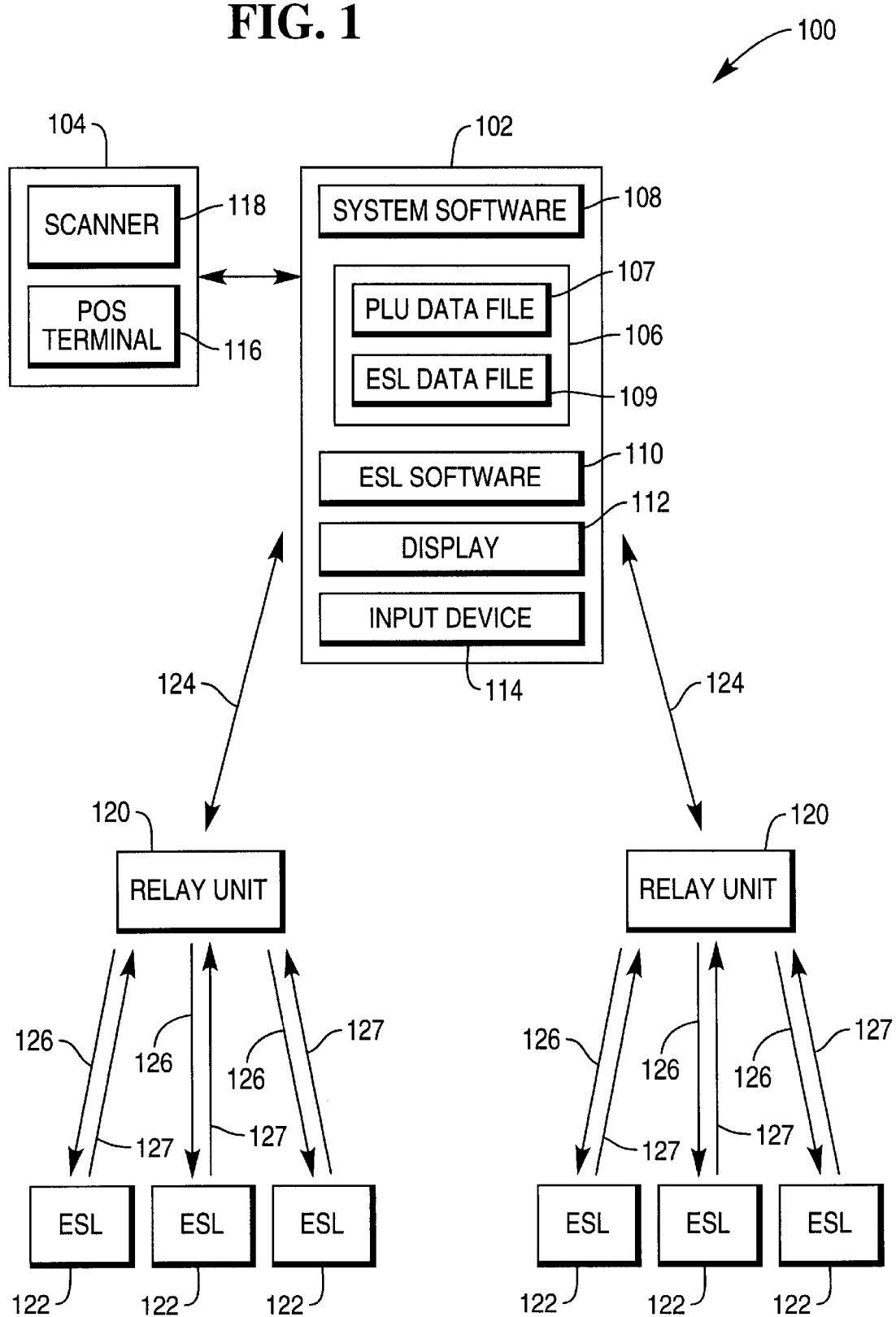
FIG. 1 is a block diagram of a transaction management system in accordance with the present invention.

FIG. 1 shows a transaction management system 100 in accordance with the present invention. The system 100 includes a host computer system 102 and a point-of-service (POS) system 104. Here, components 102 and 104 are shown as separate components that are networked together, but they and their subcomponents may also be combined or divided in various ways. Thus, host computer system 102 may be a POS terminal which doubles as a host computer for a network of other POS terminals.

The host computer system 102 includes a storage medium 106, system software 108, ESL software 110, a display 112 and an input device 114. The storage medium 106 includes a PLU data file 107 which stores item prices which are available for distribution to a POS terminal 116 by the host system 102. Alternatively, provision may be made for a bar code scanner 118 to directly access the PLU data file 107. The storage medium 106 also includes ESL data file 109 which contains item information, such as a PLU number and ESL identification information for each of the ESLs 122. The system 102 executes system software 108 which updates the contents of storage medium 106 and performs other system functions, as described in greater detail below. Input device 114 is preferably a keyboard, but it will be recognized that data can be entered in a variety of alternative manners.

POS system 104 includes bar code scanner 118 and POS terminal 116.

The system 100 also includes relay units 120 and ESLs 122. The relay units 120 may be suitably mounted in or near the ceiling of the retail establishment.

ESL software 110 records, schedules, and transmits all messages to ESLs 122. ESL software 110 controls the transmission of messages, including price change messages, to ESLs 122 utilizing relay units 120 which are placed periodically across a retail establishment. These messages are sent to the relay array units 120 through communications link 124. Communications link 124 may suitably utilize radio frequency (RF) communication, infrared (IR) communication, a wired link, or some combination of communication techniques. After receiving a message from the host system 102, the relay units 120 then transmit the message to the ESLs 122 utilizing an RF communication link 126.

After receiving a message, the ESLs 122 may respond with an acknowledgement which is transmitted to the relay units 120 over communication link 127, which may suitably utilize RF communication, IR communication, a wired link or some combination of communication techniques. The relay units 120 would then retransmit the acknowledgement message to the host system 102 over communication link 124.

Figure 2:
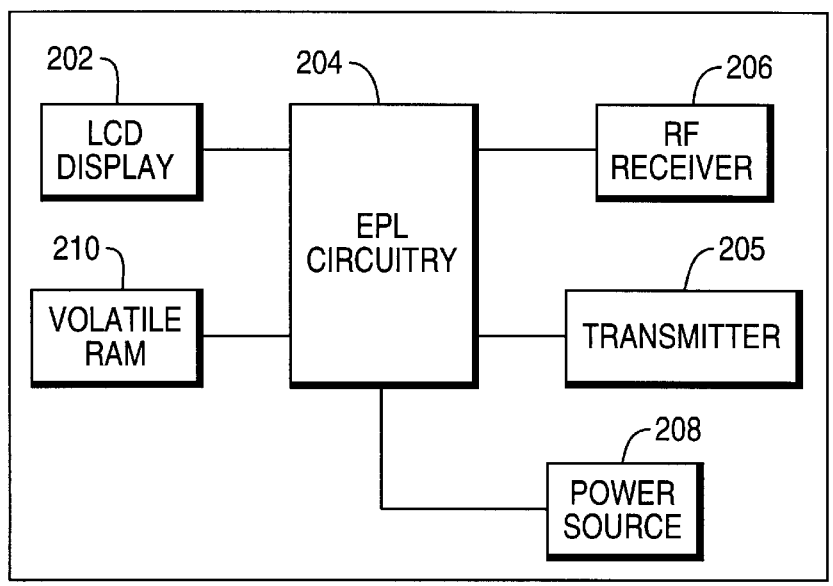
FIG. 2 is a block diagram of an ESL in accordance with the present invention.

FIG. 2 shows a block diagram of the ESL 122 in accordance with the present invention. A liquid crystal display (LCD) 202 displays information, such as item price and related data. ESL 122 includes an RF receiver 206 for receiving messages from the relay unit 120, and a transmitter 205 for transmitting messages to the relay unit 120. The transmitter 205 may utilize RF communication, IR communication, a wired link or some combination of communication techniques. A power source 208 provides power for the operation of ESL 122. The operation of ESL 122 is controlled by ESL circuitry 204 which decodes incoming messages received and performs any actions indicated by the messages. For example, if a price change message is received, the ESL circuitry 204 would cause the display 202 to be updated with the new price information. Volatile RAM 210 stores the ESL identification number and the displayed message. ESL circuitry 204 may also include a variety of components such as timers and other electronic components.

Figure 3:
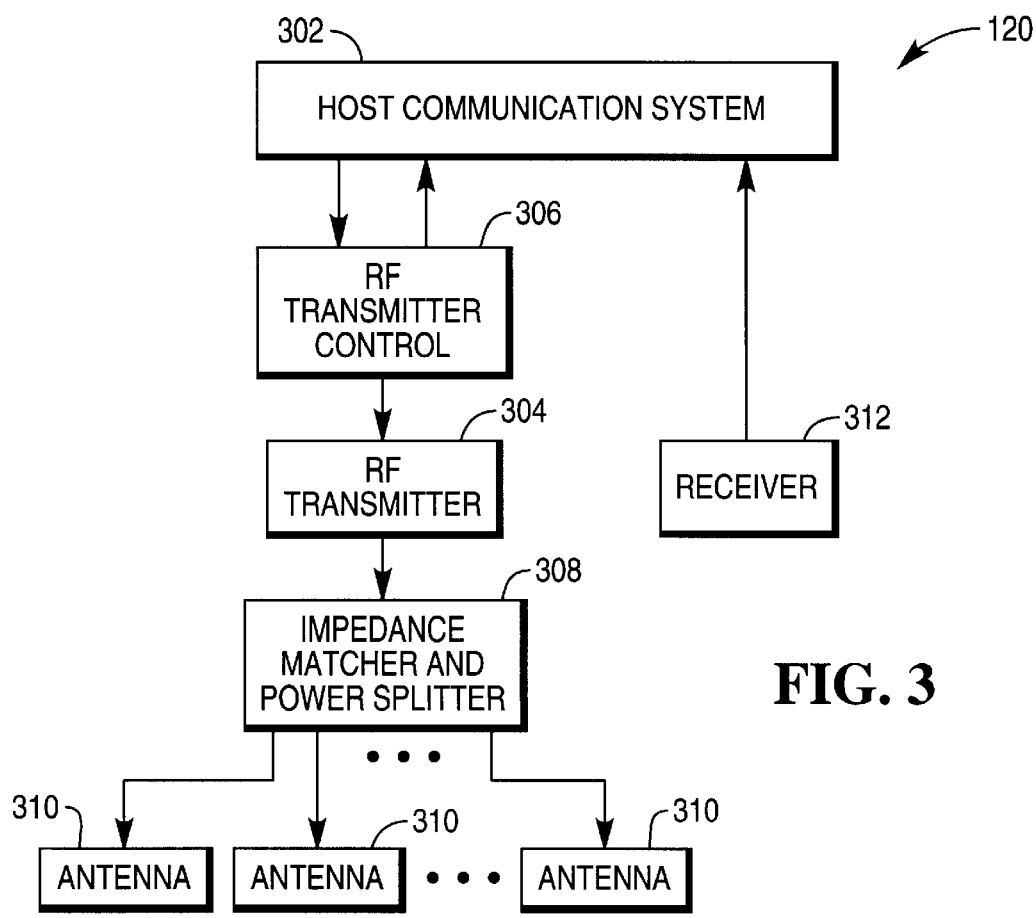
FIG. 3 is a block diagram of a relay unit in accordance with the present invention.

FIG. 3 shows a block diagram of the relay unit 120 in accordance with the present invention. A host communication system 302 provides an interface to the host system 102. Messages to the ESLs 122 are transmitted by an RF transmitter 304 which is controlled by an RF transmitter control unit 306. A transmitter output signal is fed into an impedance matcher and power splitter 308 which splits the signal between a plurality of transmit antennae 310 and maintains the characteristic impedance between the antennae 310 and the transmitter output. A receiver receives acknowledgement messages from the ESLs 122 and passes the messages to the host communication system 302, which in turn forwards the messages to the host system 102. While the transmitter 304 and the receiver 312 are shown as separate blocks, as would be understood by one of ordinary skill in the art, these devices may be combined into a single transceiver.

ESLs 122 are installed in a variety of retail establishments which present many RF barriers, such as shelves and columns, for example, which hinder the transmission of RF messages to the ESLs 122. The relay unit 120 advantageously includes the RF transmitter 308 connected to the plurality of transmit antennae 310 through the impedance matcher and power splitter 308. The transmit antennae 310 broadcast the RF signals from multiple sources in order to provide an improved pattern of RF coverage. Each antennae 310 transmits a fraction of the total transmit power into a physical area not reachable by a centrally located transmit antenna. Multiple relay units, each having multiple transmit antennae, may be installed throughout a retail establishment to provide improved RF coverage.

In one aspect, the impedance matcher and power splitter 308 may allow up to a predetermined number of transmit antennae 310 to be connected. Unused transmit antennae outputs are terminated in such a manner as to maintain a proper impedance match, ensuring that no power will be distributed to the unused outputs.

In another aspect, the impedance matcher and power splitter 308 may include connections for only the number of transmit antennae 310 to be connected. For example, if four transmit antennae are required, then the impedance matcher and power splitter would include connections for only four antennae.

FIG. 4 shows a method 500 of communicating with an ESL in accordance with the present invention. In step 502, a relay unit, such as relay unit 120, receives a message from a host system. The relay unit includes an RF transmitter, such as RF transmitter 304, and an impedance matcher and power splitter, such as impedance matcher and power splitter 308. In step 504, the RF transmitter outputs an RF signal containing the message to the impedance matcher and power splitter. In step 506, the impedance matcher and power splitter uniformly splits the RF signal between a plurality of transmit antennae, such as transmit antennae 310. In step 508, the split RF signal is transmitted by the plurality of transmit antennae to the ESL.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

We claim:

1. An electronic shelf label (ESL) system comprising:
   host communication circuitry for receiving a message from a host ESL system;
   a radio frequency (RF) transmitter for sending a signal containing the message to an impedance matcher and power splitter;
   the impedance matcher and power splitter for splitting the signal into a plurality of split signals; and
   a plurality of antennae for receiving the split signals and transmitting the split signals to an ESL, each of the plurality of antennae receiving one of the split signals.

2. The electronic shelf label system of claim 1 wherein the impedance matcher and power splitter uniformly splits the transmitter power output between the plurality of split signals.

3. The electronic shelf label system of claim 1 wherein the impedance matcher and power splitter maintains the characteristic impedance between the transmitter output and each of the plurality of antennae.

4. The electronic shelf label system of claim 1 wherein the transmit antennae are disposed in a pattern to provide an expanded area of RF coverage.

5. The electronic shelf label system of claim 1 wherein each antenna receives an equal portion of the total power output of the RF transmitter.

6. The electronic shelf label system of claim 1 wherein the impedance matcher and power splitter further comprises an unused output which is terminated to maintain an impedance match.

7. The electronic shelf label system of claim 1 wherein the transmit antennae are located near the ceiling of a retail establishment.

8. The electronic shelf label system of claim 1 further comprising an RF transmitter control unit for controlling the RF transmitter.

9. The electronic shelf label system of claim 1 further comprising the ESL for receiving the message and transmitting an acknowledgement.

10. The electronic shelf label system of claim 9 further comprising:

a receiver for receiving the acknowledgment, wherein the host communication circuitry is for relaying the acknowledgment to the host system.

11. An electronic shelf label communication method comprising the steps of:

transmitting a message from a host ESL system;

receiving the message by host communication circuitry;

sending a signal containing the message to an impedance matcher and power splitter by a radio frequency (RF) transmitter;

splitting the signal into a plurality of split signals by the impedance matcher and power splitter;

transmitting the split signals to an ESL by a plurality of antennae.

12. The method of claim 11 wherein the split signals each have substantially the same power level.

13. The method of claim 11 further comprising the step of:

maintaining the characteristic impedance between the transmitter output and each of the plurality of antennae.

14. The method of claim 11 further comprising the step of:

placing each of the transmit antennae in a separate location to provide an expanded area of RF coverage.

15. The method of claim 11 wherein each antenna receives an equal portion of the total power output of the RF transmitter.

16. The method of claim 11 further comprising the step of:

terminating any unused outputs of the impedance matcher and power splitter.

17. The method of claim 11 further comprising the step of:

placing the transmit antennae near the ceiling of a retail establishment.

18. The method of claim 11 further comprising the step of:

controlling the RF transmitter by an RF transmitter control unit.

19. The method of claim 11 further comprising the step of:

receiving the message and transmitting an acknowledgement by the ESL.

20. The method of claim 19 further comprising the step of:

relaying the acknowledgment to the host system.

* * * * *